United States Patent [19]

Tadokoro et al.

[11] Patent Number: 5,051,975
[45] Date of Patent: * Sep. 24, 1991

[54] OPTICAL RECORDING AND/OR REPRODUCING APPARATUS HAVING A TEMPERATURE ADJUSTING DEVICE

[75] Inventors: Michihiro Tadokoro; Hitoshi Imai; Kazuo Okada, all of Amagasaki, Japan

[73] Assignee: Mitsubishi Denki Kabushiki Kaisha, Tokyo, Japan

[*] Notice: The portion of the term of this patent subsequent to Nov. 14, 2006 has been disclaimed.

[21] Appl. No.: 305,931

[22] Filed: Feb. 2, 1989

Related U.S. Application Data

[63] Continuation-in-part of Ser. No. 185,052, Apr. 22, 1988, Pat. No. 4,881,204.

[30] Foreign Application Priority Data

Feb. 15, 1988 [JP] Japan ................................. 63-30910

[51] Int. Cl.$^5$ ............................................. G11B 7/08
[52] U.S. Cl. ............................. 369/44.39; 369/44.32; 369/292; 369/258
[58] Field of Search ................. 369/292, 75.1, 75.2, 369/258, 261, 44.39, 44.17–44.22, 44.32, 44.33, 112, 110; 250/201.1; 360/99, 133

[56] References Cited

U.S. PATENT DOCUMENTS 4,363,961 12/1982 Okada et al. ........................... 70/201
4,864,451 9/1989 Iwasa et al. ........................... 360/133
4,881,204 9/1989 Tadokoro et al. ................. 369/44.39

FOREIGN PATENT DOCUMENTS 0135817 9/1988 Japan.

Primary Examiner—Roy N. Envall, Jr.
Assistant Examiner—Thang V. Tran
Attorney, Agent, or Firm—Wolf, Greenfield & Sacks

[57] ABSTRACT

The present invention relates to an optical recording and/or reproducing apparatus which optically carries out operations of recording and/or reproducing of information on a data carrier, by irradiating a beam from an optical head to the data carrier. In the apparatus according to the present invention, the angle between the optical axis of the beam from the optical head and the surface of said data carrier is detected, and a temperature adjusting device brings about a difference in temperature between both surfaces of the data carrier on the basis of the detected result in respect to the angle. Then, the difference in temperature generates a thermal strain, and this thermal strain functions to cancel the strain which the data carrier has previously had. As a result, the surface of the data carrier is kept on a level, so that this surface can be vertical to the optical axis of the beam from the optical head. Therefore, in the optical recording and/or reproducing apparatus, easily maintained is the right angles between the surface of the data carrier and the optical axis of the beam, and the mechanism for focalizing the beam can be simplified to miniaturize the optical head. Furthermore, no mechanism for making the optical head oscillate is required, as a result, a high-speed accessibility is obtained.

16 Claims, 11 Drawing Sheets

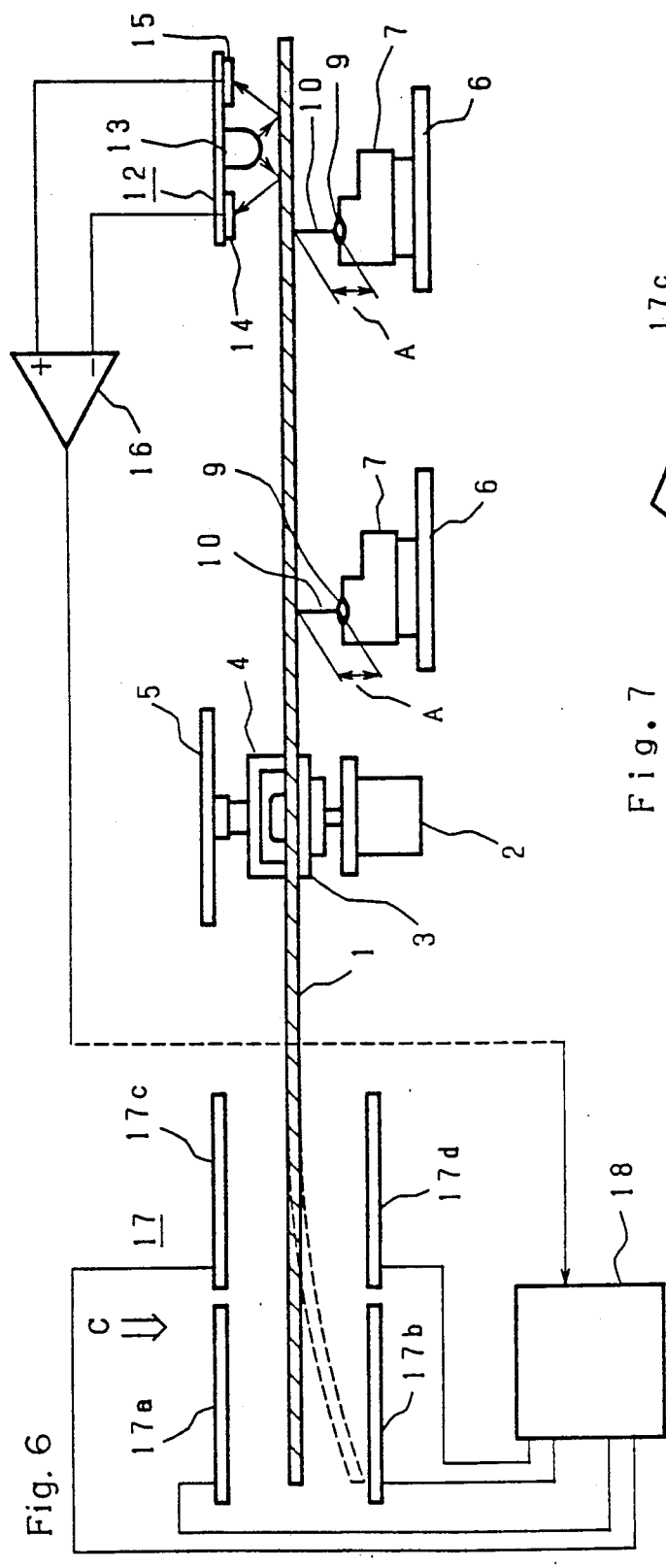
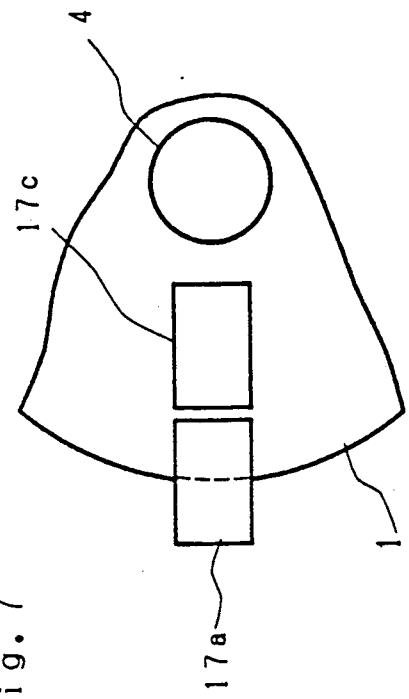
Fig. 6
Fig. 7

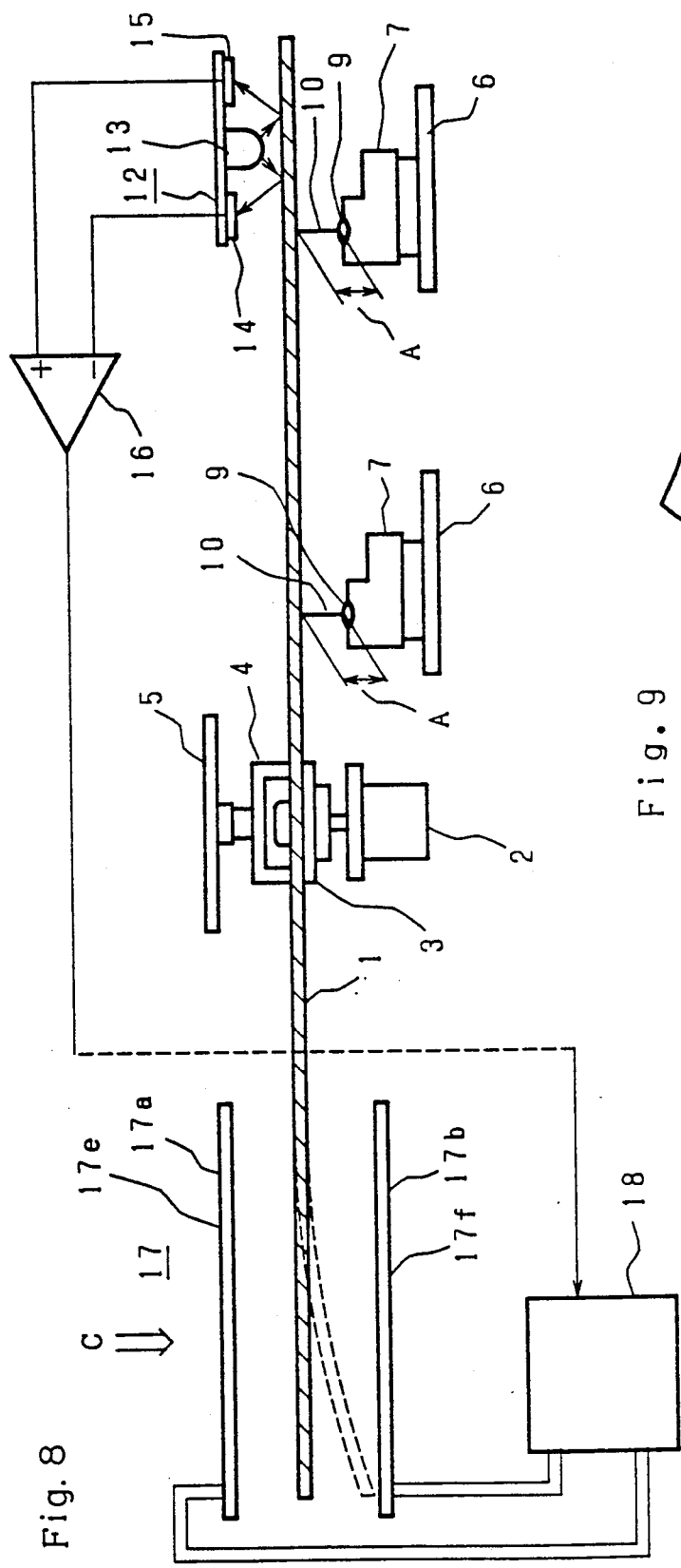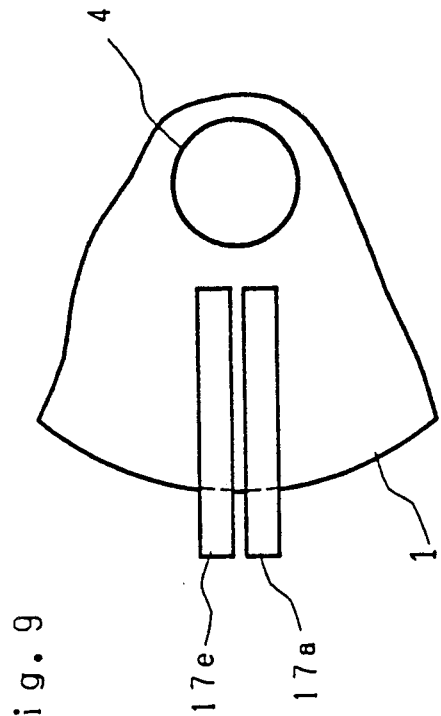

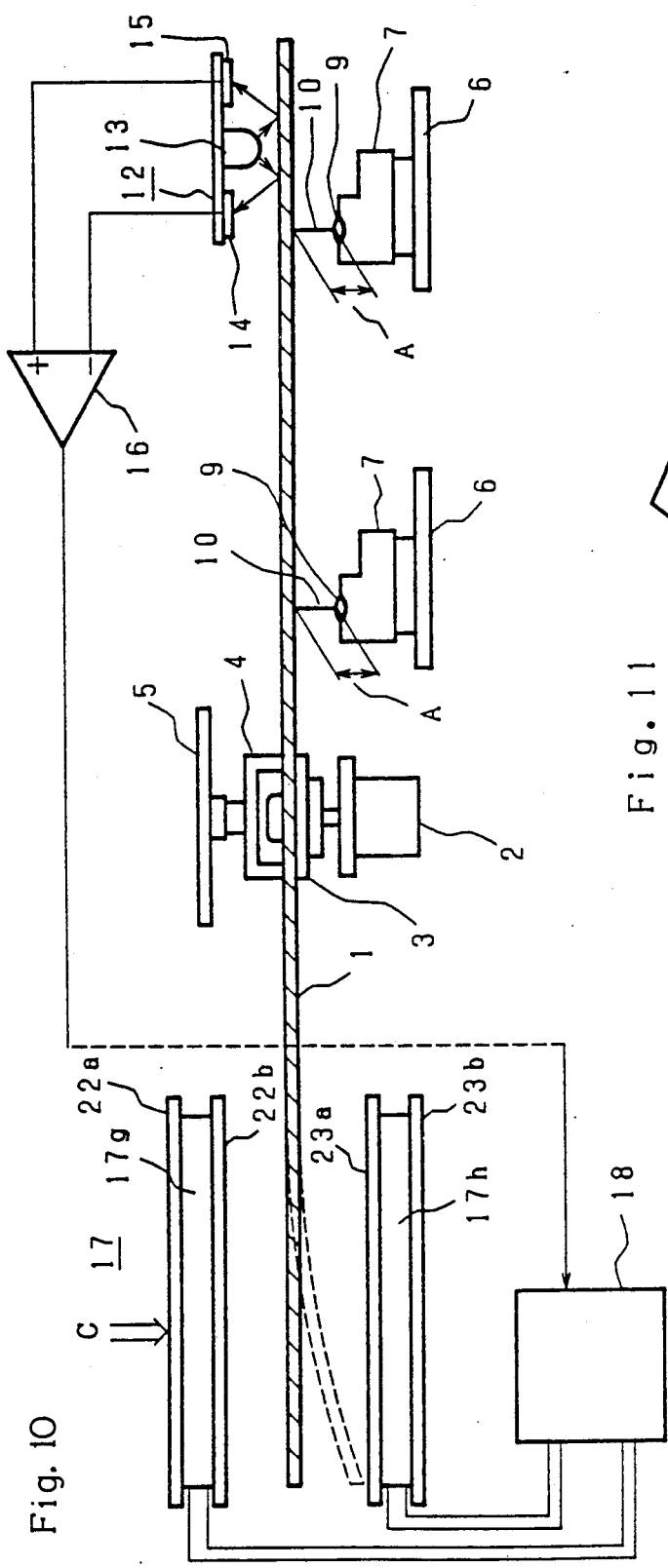

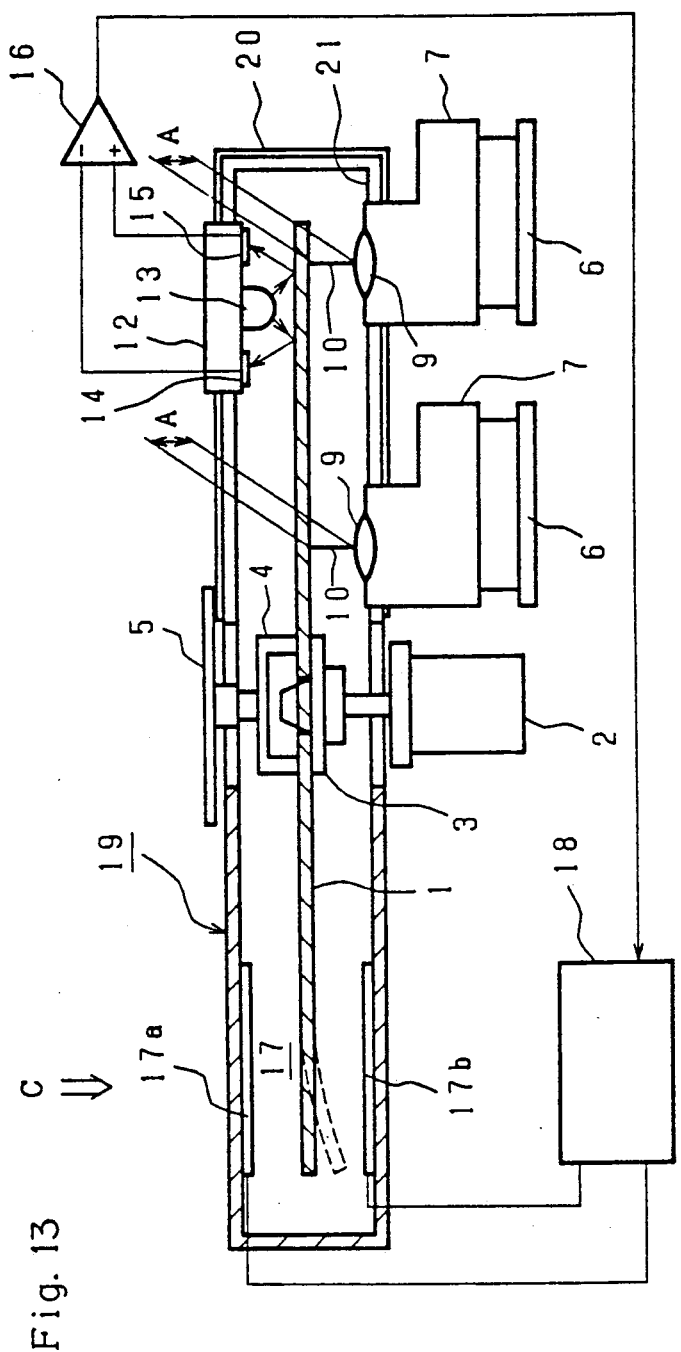
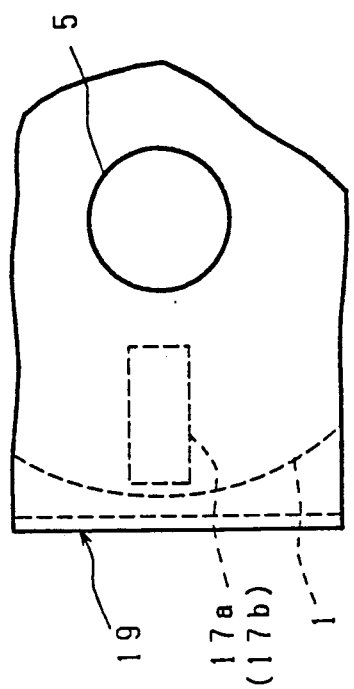
Fig. 13
Fig. 14

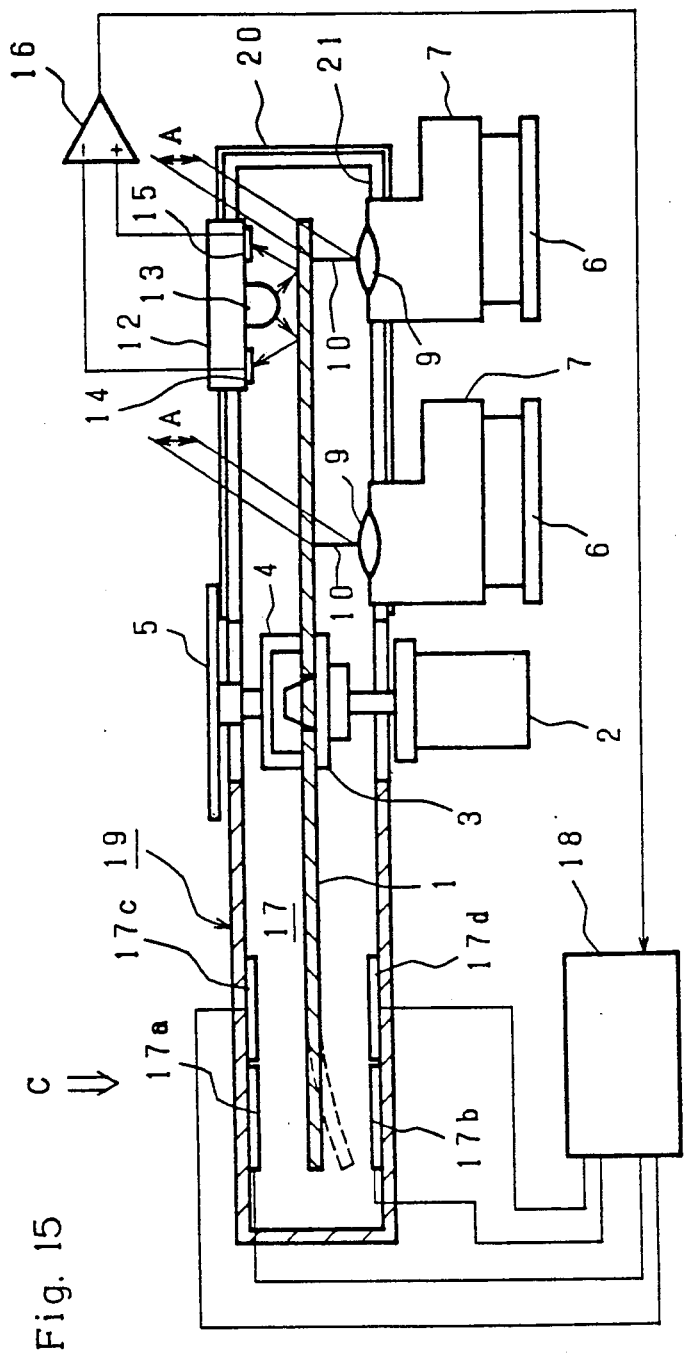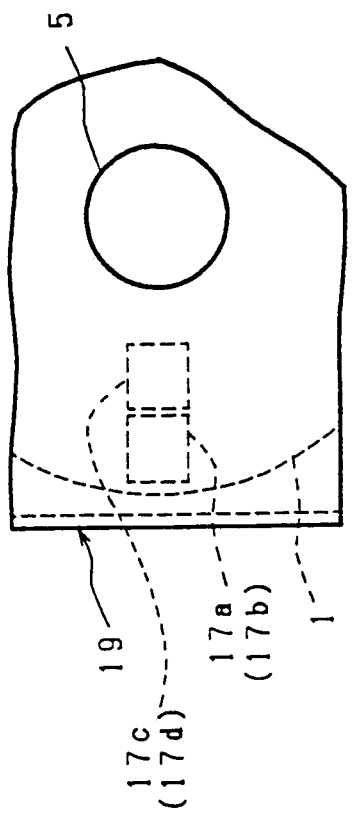
Fig. 15
Fig. 16

OPTICAL RECORDING AND/OR REPRODUCING APPARATUS HAVING A TEMPERATURE ADJUSTING DEVICE

This application is a continuation in-part of application Ser. No. 185,052 filed Apr. 22, 1988 now U.S. Pat. No. 4,881,204.

BACKGROUND OF THE INVENTION

1. Field of the Invention

The present invention relates to an optical recording and/or reproducing apparatus, such as a photodisk and the like, which carries out operation of recording and-/or reproducting information using light, and more in particular to an optical recording and/or reproducing apparatus wherein the surface of the data carrier is vertical to the optical axis of beam irradiated on the surface.

2. Description of the Prior Art

FIG. 1 is a sectional view showing a conventional optical recording and/or reproducing apparatus as disclosed in the Japanese Patent Laid-open No. 57-186237 (1982). In the Figure, the numeral 1 denotes a disk-shaped data carrier capable of carrying out operations of recording and/or reproducing information using light. The data carrier 1 is supported by a turntable 3. Rotation of a spindle motor 2 is transmitted to the turntable 3 so that the data carrier 1 can turn around its central axis. The data carrier 1 is pressed to the turntable 3 with a clamp 4 which holds the data carrier 1 and turns together with the data carrier 1, while the clamp 4 is subjected to pressure and supported to be capable of turning around by a support member 5.

Under the data carrier 1, there is provided a slide base 6 which is capable of driving in the radial direction of the data carrier 1, while above the slide base 6 there is provided an optical head 7 for radiating a beam to the data carrier 1. The optical head 7 is held by a support axis 8 to be capable of oscillating above the slide base 6. An objective lens 9 is mounted at an opening for emitting the beam from the optical head 7 being movable in the direction of an optical axis 10 of the beam (in the focus direction) and in the vertical direction to the optical axis 10 (in the tracking direction). Furthermore, a tilt-servomechanism 11 is provided on the slide base 6 so that the optical head 7 can oscillate around the support axis 8.

FIG. 2 is an enlarged sectional view showing a divergence-detecting means 12 for detecting divergences from right angles between the optical axis 10 and the surface of the data carrier 1. In the figure, the detecting means 12 comprises a radiating element 13, light-receiving elements 14, 15 disposed at an equal distance from the radiating element 13 with the radiating element 13 therebetween and a calculation amplifier 16 which amplifies the signal being output from the light-receiving elements 14, 15 and calculates it. Thus the detecting means 12 detects the extent of tilt of the surface of the data carrier 1 to the detecting means 12 by the difference in the amount of the light received by the two light-receiving elements 14, 15 which receive the reflected light from the data carrier 1 to turn the extent of tilt of the surface to the optical axis 10 into the output signal from the calculation amplifier 16.

In an optical recording and/or reproducing apparatus of such a construction as described above, the data carrier 1 is disposed between the turntable 3 and the clamp 4 and driven to turn by the spindle motor 2, as shown in FIG. 1. In such a case, the data carrier 1 is deformed, generally into an armlike shape as shown in the drawing, because of a shrinkage caused immediately after molding, a secular change, a change in temperature and the like.

When the slide base 6 is driven in the radial direction of the data carrier 1 to reach under the surface of the tilted region near the outer peripheral portion of the data carrier 1, it comes to be impossible that the optical axis 10 of the beam, which is radiated from the optical head 7 above the slide base 6, and the surface of the data carrier 1 should be vertical. The divergence-detecting means 12 as shown in FIG. 2 detects this state and the tilt-servomechanism 11 operates in response to the signal from the calculation amplifier 16 to make the optical head 7 turn around the support axis 8, so that the optical axis 10 can be vertical to the surface of the data carrier 1.

In the case where the divergence from right angles between the optical axis 10 and the surface of the data carrier 1 is kept, a distortion occurs in the shape of the condensing spot converged on the surface, pits (perforations) corresponding to information can not exactly be formed on the surface in recording information, while such problems as a decrease of the C/N ratio and an increase of an error in reproducing information should occur. In addition, troubles will happen in controlling, or in maintaining the condensing spot on the surface (the tracks). In a digital photodisk of a tracking control method wherein the condensing spot is made to follow the surface (the tracks) using a diffracted light method or the like, recording errors of the information signals increase.

Since aforementioned troubles will occur in the case where a divergence from right angles made by the optical axis 10 and the surface of the data carrier 1, the right angles should be kept by making the optical head 7 oscillate by means of the tilt-servomechanism 11. In such a case since the objective lens 9 also shifts, the distance between the objective lens 9 and the surface of the data carrier 1 greatly changes. That is, as shown in FIG. 1, the above-said distance greatly varies from A at a point where the surface of the data carrier 1 remains horizontal to B at a point where that of the data carrier 1 is titling. In order to overcome such a difference in distance, the objective lens 9 is made to conduct parallel translations in the direction of the optical axis 10 to converge the beam on the surface of the data carrier 1.

The data carrier 1 is housed in a housing as disclosed, for example, in Japanese Patent Application Laid-open No. 61-287088 (1986). The housing 19 is shown in FIG. 3, wherein an opening 21 for inserting the head is provided in such a manner that it is capable of opening and closing by a shutter 20 mounted slidably in the direction of an arrow (a) in the figure.

In a conventional optical recording and/or reproducing apparatus as shown above, it has been necessary to shift the objective lens 9 on the optical head 7 substantially in the direction of the optical axis 10 for the purpose of focalizing, which has resulted in that a large-sized optical head 7 has been required. Moreover, as for the tilt-servomechanism 11 for oscillating the optical head 7, a large-sized one had been required. As a result, their great amount of weight on the slide base 6 which drives in the radial direction of the data carrier 1 has made high-speed driving (highspeed accessibility to informations) to be difficult.

SUMMARY OF THE INVENTION

The present invention is directed to solve aforementioned problems. In the optical recording and/or reproducing apparatus according to the present invention, a surface of a sheet-shaped data carrier is kept to be a level with no curve by controlling a temperature adjusting device which causes a difference in temperature between both surfaces of the data carrier on the basis of the results on the angle formed by the surface and an optical axis of a beam irradiated thereto.

A first object of the present invention is to provide an optical recording and/or reproducing apparatus wherein no deterioration is caused in the characteristics of recording and/or reproducing information and the right angles between the surface of the data carrier and the optical axis of the beam irradiated thereto can easily be maintained.

A second object of the present invention is to provide an optical recording and/or reproducing apparatus wherein the focalizing mechanism of the beam is simplified to miniaturize an optical head.

A third object of the present invention is to provide an optical recording and/or reproducing apparatus wherein no oscillation mechanism of the optical head is required and a high-speed accessibility is obtained.

A fourth object of the present invention is to provide an optical recording and/or reproducing apparatus wherein it is possible to miniaturize the whole apparatus by providing a temperature adjusting device on an inner wall of a housing means in which the data carrier is housed.

A fifth object of the present invention is to provide an optical recording and/or reproducing apparatus wherein it is possible to increase operation efficiency of a temperature adjusting device by disposing such a temperature adjusting device with the data carrier between.

A sixth object of the present invention is to provide an optical recording and/or reproducing apparatus wherein it is possible to more minutely rectify deformation of the data carrier by a multi-partite construction of the temperature adjusting device.

A seventh object of the present invention is to provide an optical recording and/or reproducing apparatus wherein it is not necessary to change the circumambient temperature environment by using heating elements simultaneously with cooling elements as a temperature adjusting device.

An eighth object of the present invention is to provide an optical recording and/or reproducing apparatus wherein it is not necessary to change the circumambient temperature environment by using such plural semiconductor elements having Peltier effect as a temperature adjusting device that a single kind of elements are required.

The above and further objects and features of the invention will more fully be apparent from the following detailed description with accompanying drawings.

BRIEF DESCRIPTION OF THE DRAWINGS

FIG. 6 is a sectional side elevation view showing the principal part of the second embodiment of the optical recording and/or reproducing apparatus according to the present invention;

FIG. 7 is a partial top view as seen from the direction of the arrow C of FIG. 6;

FIG. 8 is a sectional side elevation view showing the principal part of the third embodiment of the optical recording and/or reproducing apparatus according to the present invention;

FIG. 9 is a partial top view as seen from the direction of the arrow C of FIG. 8;

FIG. 10 is a sectional side elevation view showing the principal part of the fourth embodiment of the optical recording and/or reproducing apparatus according to the present invention;

FIG. 11 is a partial top view as seen from the direction of the arrow C of FIG. 10;

FIG. 13 is a sectional side elevation view showing the principal part of the fifth embodiment of the optical recording and/or reproducing apparatus according to the present invention;

FIG. 14 is a partial top view as seen from the direction of the arrow C of FIG. 13;

FIG. 15 is a sectional side elevation view showing the principal part of the sixth embodiment of the optical recording and/or reproducing apparatus according to the present invention;

FIG. 16 is a partial top view as seen from the direction of the arrow C of FIG. 15;

DESCRIPTION OF THE PREFERRED EMBODIMENTS

The present invention will be described with reference to the drawings showing the embodiments thereof.

Figure 1:
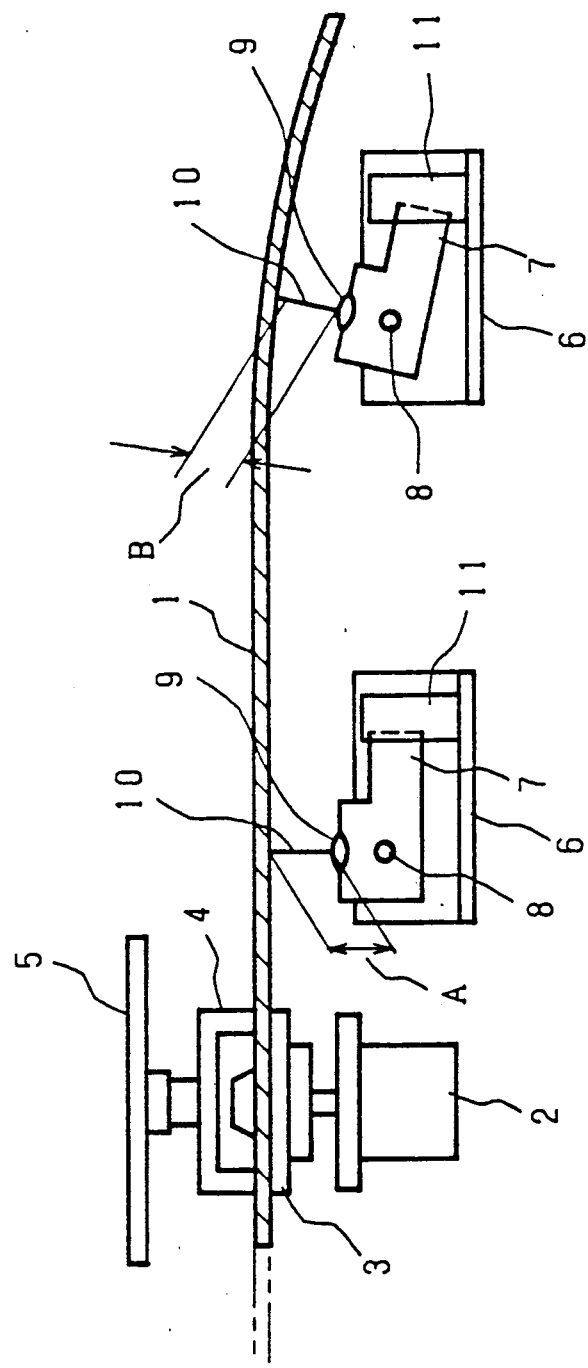
FIG. 1 is a sectional side elevation view showing the principal part of a conventional optical recording and-/or reproducing apparatus.
Figure 2:
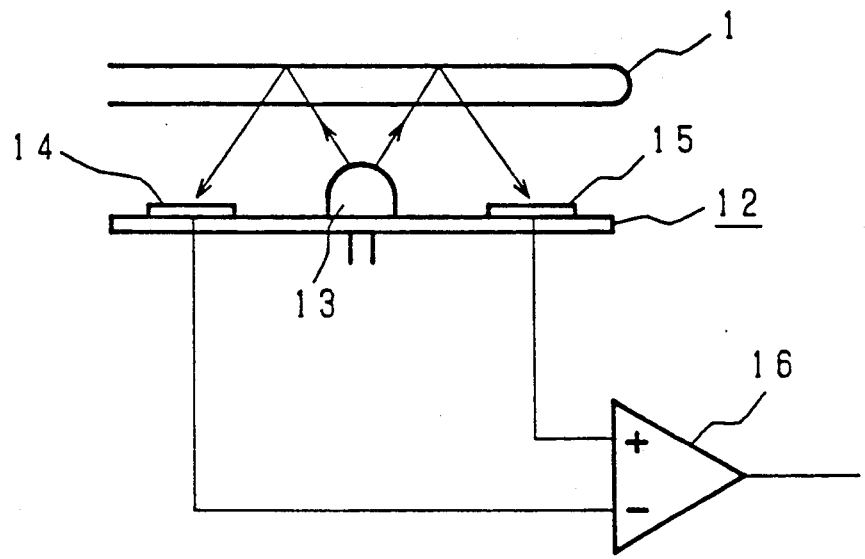
FIG. 2 is an enlarged sectional view showing a divergence-detecting means in a conventional optical recording and/or reproducing apparatus.
Figure 3:
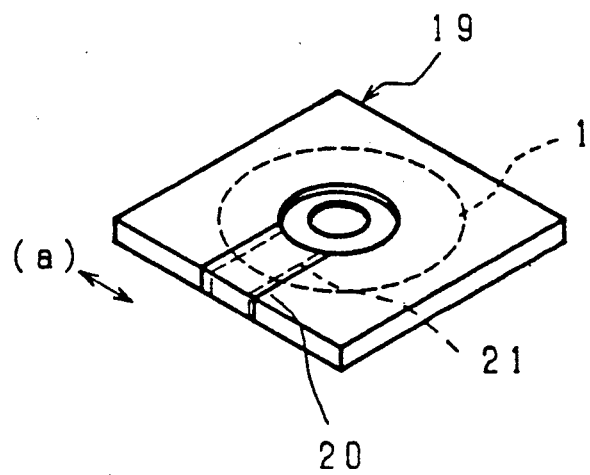
FIG. 3 is a perspective view of a housing of a data carrier in a conventional optical recording and/or reproducing apparatus.
Figure 4:
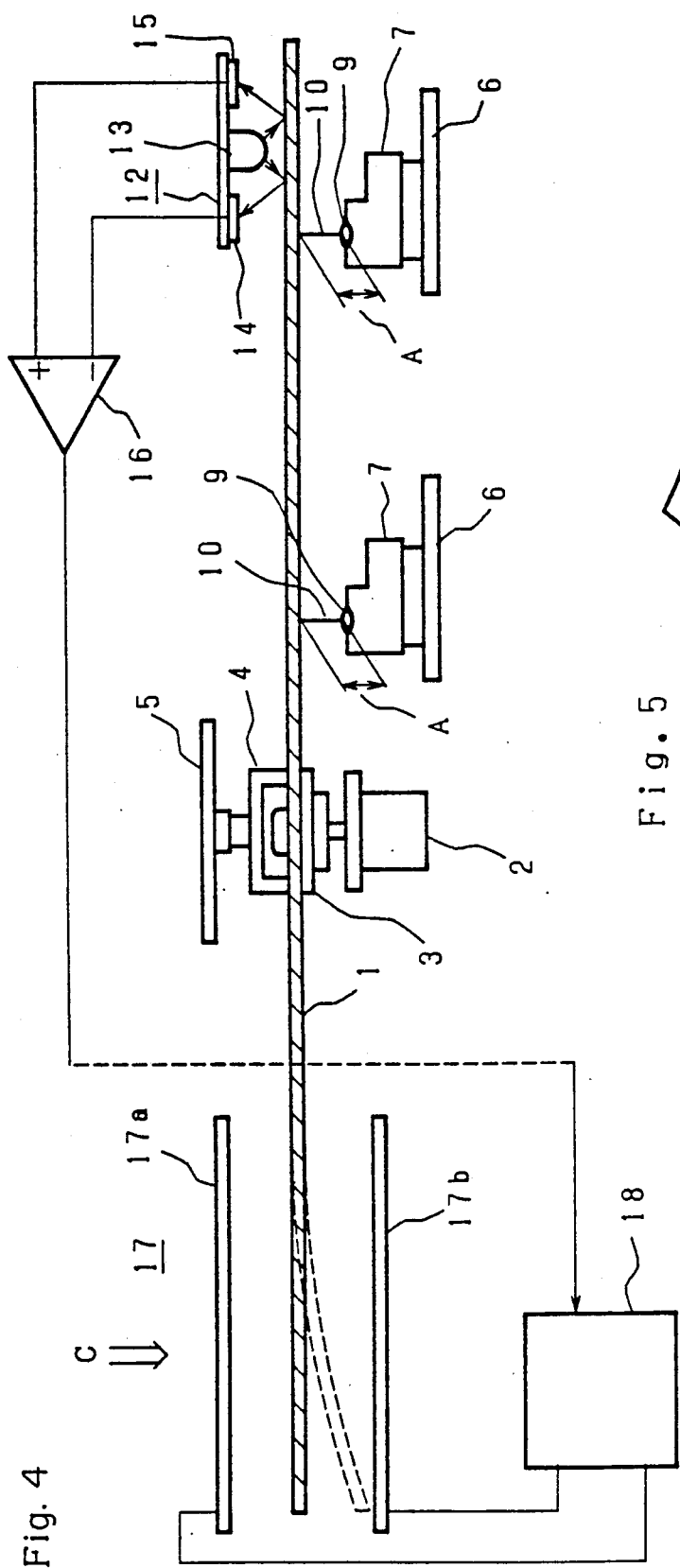
FIG. 4 is a sectional side elevation view showing the principal part of the first embodiment of the optical recording and/or reproducing apparatus according to the present invention.
Figure 5:
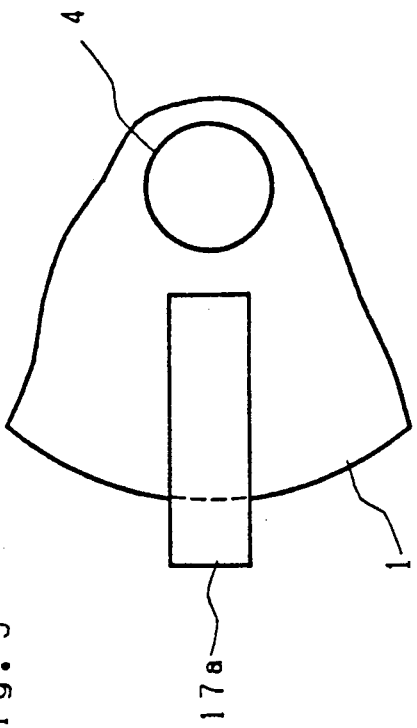
FIG. 5 is a partial top view as seen from the direction of the arrow C of FIG. 4.

FIG. 4 is a sectional view showing the first embodiment of the present invention, while FIG. 5 is a top view as seen from the direction of C of FIG. 4. In these figures, since like numerals (1 to 10 and 12 to 16) in FIGS. 1 to 3 denote like members as those provided in a conventional optional recording and/or reproducing apparatus, explanation on them will be omitted here.

In the optical recording and/or reproducing apparatus according to the present invention, the optical head 7 is secured so firmly on the slide base 6 that it does not oscillate. The divergence-detecting means 12 is disposed near the outer periphery of the data carrier 1. Also disposed is a temperature adjusting device 17 comprising two heating elements 17a, 17b which are positioned at near the outer periphery of the data carrier 1 between. Each of the heating element 17a, 17b is connected to a controlling power circuit 18 which is connected to the calculation amplifier 16 of the divergence-detecting means 12, and the controlling power circuit 18 supplies the electric power to each of the heating element 17a, 17b in response to the output signals from the calculation amplifier 16.

In an optical recording and/or reproducing apparatus of such a construction as described above, a disk which is a data carrier 1 is disposed on a turntable 3 by means of a clamp 4 and turns by means of a spindle motor 2. At this state, the divergence-detecting means 12 detects that the outer peripheral portion of the data carrier 1 is deformed downward, as shown with a broken line in the figure, which is output as an output signal from the calculation amplifier 16. In response to this output signal, the controlling power circuit 18 gives an instruction that the heating element 17b alone which is provided under the data carrier 1 should generate heat. Then, the temperature on the lower surface of the data carrier 1 becomes higher than that on the upper surface thereof to cause thermal expansion of the lower surface thereof. As a result, the outer peripheral portion of the data carrier 1 becomes warped upward, and soon it becomes flat. When the data carrier 1 has become flat, the controlling power circuit 18, receiving the output signal from the divergence-detecting means 12, gives another instruction that the heating element 17b should stop heating. In this way, by feeding the output signal from the divergence-detecting means 12 back to the controlling power circuit 18, a proper difference in temperature is generated between both surfaces of the data carrier 1 to generate a thermal strain, which functions to cancel the amount of strain which the data carrier 1 has kept in advance. As a result, it is always possible to keep the surface of the data carrier 1 to be a level. Once the surface of the data carrier 1 is kept on a level, the surface of the data carrier 1 is usually maintained to be vertical to the optical axis 10 of the beam irradiated on the surface even if the optical head 7 shifts. As a result, it is needless to say that, not only no deterioration is caused in the characteristics of recording and/or reproducing apparatus of information, but also no trouble is caused in controlling the apparatus. Besides, a so-called tilt-servomechanism 11 comes to be unnecessary which has been conventionally used for making the optical head 7 oscillate. Moreover, since the distance A between the surface of the data carrier 1 and an objective lens 9 on the optical head 7 does not change, it is not necessary that the objective lens 9 should shift, as greatly as in a conventional apparatus, in the direction of the optical axis 10. Only a slight shift corresponding to varieties in position and oscillations of the surface of the data carrier is required. Consequently, the focus-adjusting mechanism of the objective lens 9 as well as the optical head 7 can be miniaturized. With them, since the weight on the slide base 6 being greatly reduced, the slide base 6 and the optical head 7 are capable of driving at a high speed. (It is called high-speed accessibility.)

As an additional effect, the temperature adjusting device 17 can be used for defrosting when the dew is condensed, without deforming the data carrier 1. In such a case, both heating elements 17a, 17b are made to heat simultaneously.

Other embodiments of the present invention will be described with reference to the drawings. FIG. 6 is a sectional view showing the second embodiment of the present invention, while FIG. 7 is a top view as seen from the direction of the arrow C of FIG. 6, which show a case where the deformation of the data carrier 1 can more minutely be rectified by a multi-partite construction of the heating elements 17a to 17d.

FIG. 8 is a sectional view showing the third embodiment of the present invention, while FIG. 9 is a top view as seen from the direction of the arrow C thereof, which show a case where the temperature adjusting device 17 comprises heating elements 17a, 17b and cooling elements 17e, 17f. By using them simultaneously, it is not necessary to change the circumambient temperature environment.

FIG. 10 is sectional view showing the fourth embodiment of the present invention, while FIG. 11 is a top view as seen from the direction of the arrow C thereof, which show a case where semiconductor elements 17g, 17h having Peltier effect are used as a temperature adjusting device. Peltier effect makes it possible that the upper side of each of the elements 17g, 17h may function as heating source and the lower side thereof as heat-absorbing source, and vice versa, by changing the direction of the electric current. Thus, the apparatus can be used without changing the circumambient temperature environment only by a signal kind of elements 17g, 17h.

Here the operation of Peltier effect of the semiconductor elements 17g, 17h will be described. As shown with a broken line in FIG. 10, when the outer peripheral portion of the data carrier 1 is deformed downward, the electric current is sent to the semiconductor element 17g so that the lower side 22b may function as a cooling source and the upper side 22a as a heating source. For another semiconductor element 17h, the electric current is sent so that the lower side 23b may function as a cooling source and the upper side 23a as a heating source, and thereby the upper surface of the data carrier 1 is cooled, while the lower surface thereof is heated. As a result, a difference in temperature is generated between the upper and the lower surfaces to rectify the data carrier 1 to be flat.

Now several embodiments will be described which are provided with a housing being used to house the data carrier 1.

Since like signals in FIGS. 4 to 11 denote like parts through the figures, explanation will be omitted here.

Figure 12:
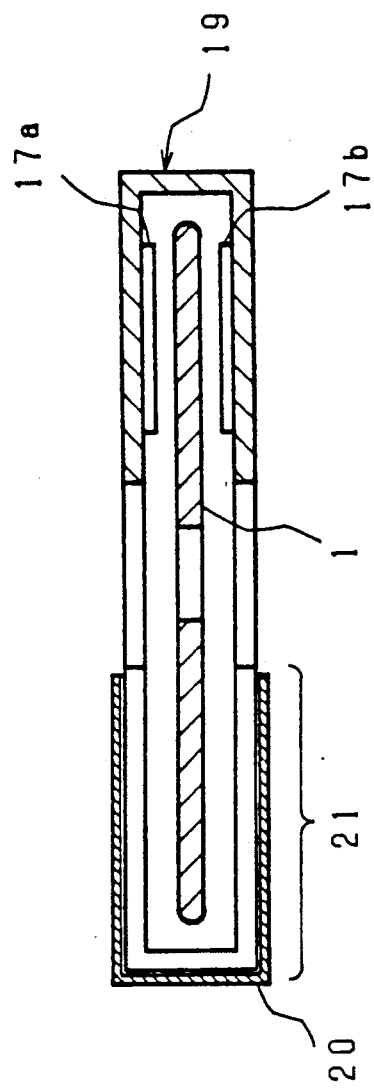
FIG. 12 is a sectional side elevation view showing the fundamental structure of the housing of the data carrier in the optical recording and/or reproducing apparatus according to the present invention.

FIG. 12 shows a fundamental construction of a housing 19 being used to house the data carrier 1, wherein heating elements 17a, 17b are disposed on the wall thereof provided with an opening 21 for inserting the head which is opened and closed by a shutter 20 of a shape as shown in FIG. 3, with the data carrier 1 between.

FIG. 13 is a sectional view showing the fifth embodiment of the present invention, while FIG. 14 is a figure as seen from the direction of the arrow C of FIG. 13. In this embodiment, such a structure as shown in FIGS. 4 and 5 is housed in the housing 19 of the data carrier, wherein the heating elements 17a, 17b are disposed on the inner wall of the housing 19 with the outer peripheral portion of the data carrier 1 between.

As mentioned above, it is possible to miniaturize the apparatus by disposing the temperature adjusting device 17 on the inner wall of the housing 19.

FIG. 15 is a sectional view showing the sixth embodiment of the present invention, while FIG. 16 is a figure as seen from the direction of the arrow C of FIG. 15. In this embodiment, such a structure as shown in FIGS. 6 and 7 is housed in the housing 19 of the data carrier, wherein the heating elements 17a to 17d are disposed on the inner wall of the housing 19 with the outer peripheral portion of the data carrier 1 between.

Figure 17:
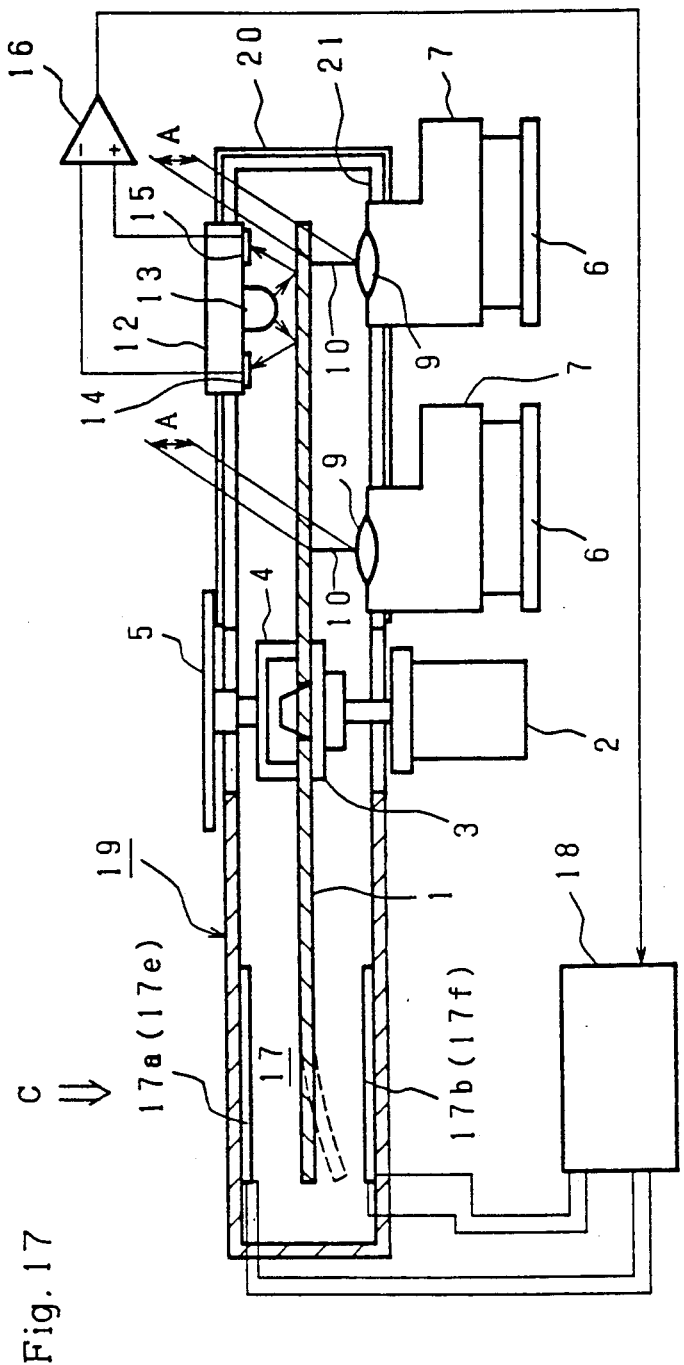
FIG. 17 is a sectional side elevation view showing the principal part of the seventh embodiment of the optical recording and/or reproducing apparatus according to the present invention.
Figure 18:
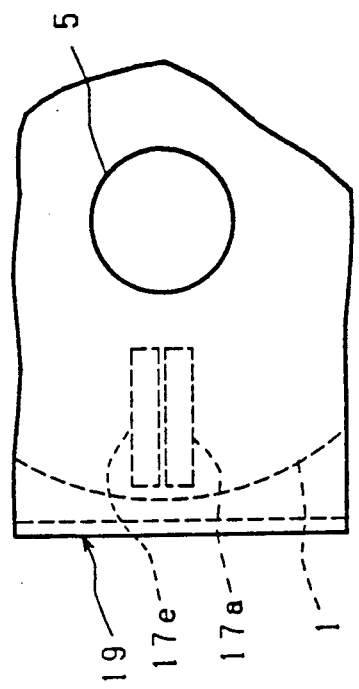
FIG. 18 is a partial top view as seen from the direction of the arrow C of FIG. 17.

FIG. 17 is a sectional view showing the seventh embodiment of the present invention, while FIG. 18 is a figure as seen from the direction of the arrow C of FIG. 17, wherein the housing 19 of the data carrier is provided with a structure as shown in FIGS. 8 and 9, and heating elements 17a, 17b and cooling elements 17e, are disposed on the inner wall of the housing 19.

Figure 19:
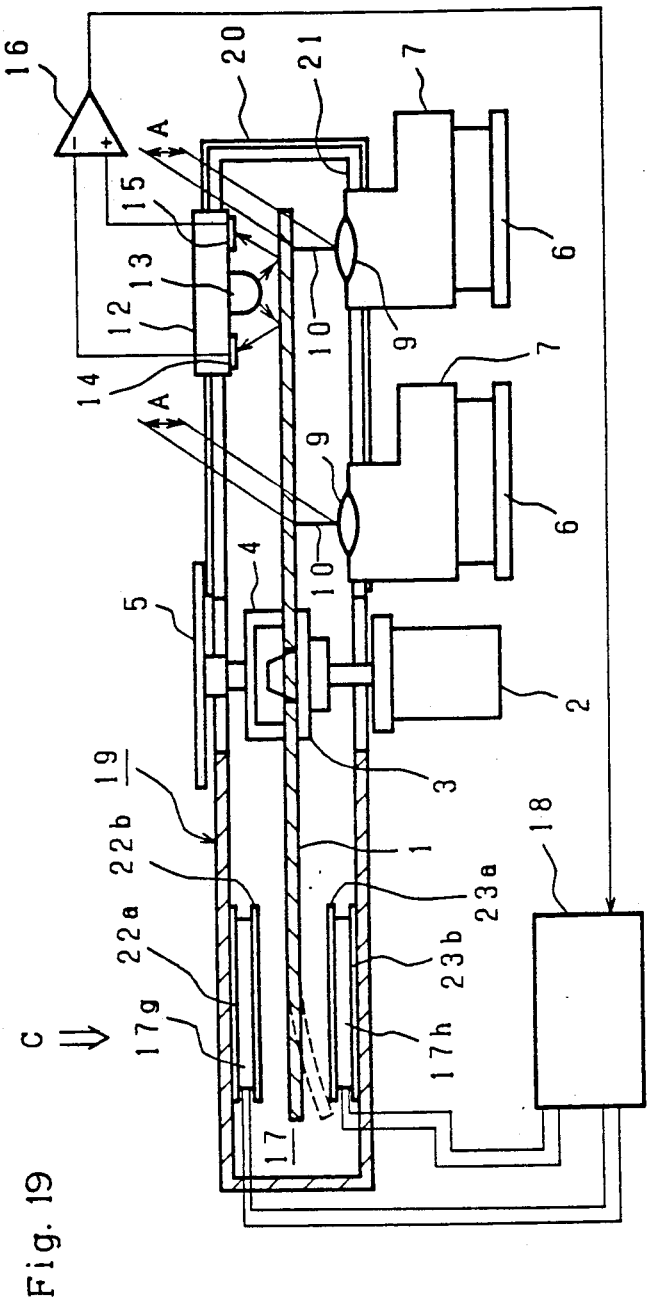
FIG. 19 is a sectional side elevation view showing the principal part of the eighth embodiment of the optical recording and/or reproducing apparatus according to the present invention.
Figure 20:
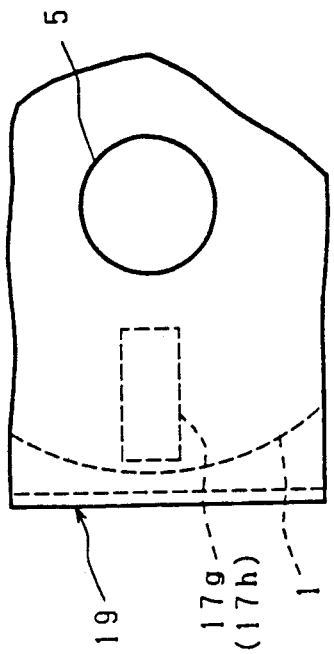
FIG. 20 is a partial top view as seen from the direction of the arrow C of FIG. 19.

FIG. 19 is a sectional view showing the eighth embodiment of the present invention, while FIG. 20 is a figure as seen from the direction of the arrow C of FIG. 19, wherein semiconductor elements 17g, 17h of a structure as shown in FIGS. 10 and 11 are disposed on the inner wall of the housing 19 of the data carrier.

In the third, fourth, seventh and eighth embodiments, the heating source and the heat-absorbing source are respectively disposed on both surfaces facing to the data carrier 1. Disposing them on either surface will also do, thereby the same effect can be obtained, though the efficiency is slightly lowered.

As this invention may be embodied in several forms without departing from the spirit of essential characteristics, thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An optical recording and/or reproducing apparatus, comprising;
   an optical head irradiating a beam to a sheet-shaped data carrier capable of recording and/or reproducing information optically,
   a detecting means for detecting an angle between an optical axis of said beam and a surface of said data carrier,
   a temperature adjusting device which brings about a difference in temperature between both surfaces of said data carrier, and
   a control means for controlling said temperature adjusting device in according with a result detected by said detecting means so that said optical axis of the beam is vertical to the surface of said data carrier.

2. An optical recording and/or reproducing apparatus as set forth in claim 1, further comprising a housing means for housing said data carrier and being provided with said temperature adjusting device on a wall thereof.

3. An optical recording and/or reproducing apparatus as set forth in claim 2, wherein said housing means is provided with an opening for providing access to said data carrier housing by said optical head and a shutter for opening and closing said opening.

4. An optical recording and/or reproducing apparatus as set forth in claim 1, wherein said data carrier is disk-shaped and said temperature adjusting device is provided near an outer periphery of said data carrier.

5. An optical recording and/or reproducing apparatus as set forth in claim 1, wherein said temperature adjusting device comprises a pair of elements each of which is disposed at a position with said data carrier between.

6. An optical recording and/or reproducing apparatus as set forth in claim 5, further comprising a housing means for housing said data carrier and being provided with said temperature adjusting device on a wall thereof.

7. An optical recording and/or reproducing apparatus as set forth in claim 5, wherein both said two elements are heating elements.

8. An optical recording and/or reproducing apparatus as set forth in claim 5, wherein both said two elements are cooling elements.

9. An optical recording and/or reproducing apparatus as set forth in claim 1, wherein said temperature adjusting device comprises plurality of elements disposed at two or more positions with said data carrier between.

10. An optical recording and/or reproducing apparatus as set forth in claim 9, further comprising a housing means for housing said data carrier and being provided with said temperature adjusting device on a wall thereof.

11. An optical recording and/or reproducing apparatus as set forth in claim 9, wherein plurality of said elements are all heating elements.

12. An optical recording and/or reproducing apparatus as set forth in claim 9, wherein plurality of said elements are all cooling elements.

13. An optical recording and/or reproducing apparatus as set forth in claim 1, wherein said temperature adjusting device comprises at least one heating element and one cooling element each provided at a side of one surface of said data carrier, and at least one heating element and one cooling element each provided at the side of other surface of said data carrier.

14. An optical recording and/or reproducing apparatus as set forth in claim 13, further comprising a housing means for housing said data carrier and being provided with said temperature adjusting device on a wall thereof.

15. An optical recording and/or reproducing apparatus as set forth in claim 1, wherein said temperature adjusting device comprises plural semiconductor elements having Peltier effect and being disposed at positions with said data carrier between.

16. An optical recording and/or reproducing apparatus as set forth in claim 15, further comprising a housing means for housing said data carrier and being provided with said temperature adjusting device on a wall thereof.

* * * * *